United States Patent
Nakano et al.

(10) Patent No.: US 8,155,839 B2
(45) Date of Patent: Apr. 10, 2012

(54) STEERING DEVICE FOR VEHICLE

(75) Inventors: Shiro Nakano, Osaka (JP); Masaya Segawa, Yamatokoriyama (JP)

(73) Assignee: Jtekt Corporation, Osaka (JP)

( * ) Notice: Subject to any disclaimer, the term of this patent is extended or adjusted under 35 U.S.C. 154(b) by 321 days.

(21) Appl. No.: 12/448,432

(22) PCT Filed: Dec. 3, 2007

(86) PCT No.: PCT/JP2007/073325
§ 371 (c)(1),
(2), (4) Date: Jun. 19, 2009

(87) PCT Pub. No.: WO2008/075552
PCT Pub. Date: Jun. 26, 2008

(65) Prior Publication Data
US 2010/0004825 A1    Jan. 7, 2010

(30) Foreign Application Priority Data
Dec. 21, 2006  (JP) .................................. 2006-344594

(51) Int. Cl.
*B62D 6/00*        (2006.01)
(52) U.S. Cl. .......................................... 701/42; 700/44
(58) Field of Classification Search ................... 701/42, 701/41; 700/44
See application file for complete search history.

(56) References Cited

U.S. PATENT DOCUMENTS

| | | | |
|---|---|---|---|
| 6,415,215 B1 | 7/2002 | Nishizaki et al. | |
| 7,349,781 B2 * | 3/2008 | Tamaizumi ..................... | 701/42 |
| 7,512,468 B2 * | 3/2009 | Tamaizumi et al. ............ | 701/41 |
| 2005/0209751 A1 * | 9/2005 | Kato ............................... | 701/41 |
| 2006/0064214 A1 * | 3/2006 | Takimoto et al. ............... | 701/41 |
| 2006/0080016 A1 | 4/2006 | Kasahara et al. | |

FOREIGN PATENT DOCUMENTS

| | | |
|---|---|---|
| JP | 4-325381 | 11/1992 |
| JP | 5-229443 | 9/1993 |
| JP | 7033039 | 2/1995 |
| JP | 8-332972 | 12/1996 |
| JP | 2001-130430 | 5/2001 |
| JP | 2001-233230 | 8/2001 |
| JP | 2005-041386 | 2/2005 |
| JP | 2006-002805 | 1/2006 |
| JP | 2006-168481 | 6/2006 |

* cited by examiner

*Primary Examiner* — Thomas Black
*Assistant Examiner* — Shardul Patel
(74) *Attorney, Agent, or Firm* — Rabin & Berdo, Jr.

(57) ABSTRACT

A motor vehicle steering apparatus is provided with: a steering-angle feedforward-control-value setting unit arranged to set a steering angle value that corresponds to a steering state; a vehicle-behavior-stabilization controlling unit including a steering-angle feedback-control-value setting unit arranged to set a steering-angle correction value that corresponds to vehicle behavior; and a feedback-gain changing unit arranged to decrease a gain of the steering-angle feedback-control-value setting unit to a value less than at a normal time, when the steering-angle correction value is equal to or less than a predetermined value, during vehicle-behavior stabilizing control by the vehicle-behavior-stabilization controlling unit.

9 Claims, 3 Drawing Sheets

STEERING DEVICE FOR VEHICLE

TECHNICAL FIELD

The present invention relates to a motor vehicle steering apparatus to which a steering angle value is set corresponding to a steering state.

BACKGROUND ART

As a motor vehicle steering apparatus, there has been proposed a steer-by-wire system in which mechanical coupling between a steering wheel and a steering mechanism is abolished (Patent Document 1). In the steer-by-wire system, an operation angle of the steering wheel is detected by a sensor, and a steering actuator is controlled corresponding to output of the sensor. The driving force of the steering actuator is transmitted to the steering mechanism. In the steer-by-wire system, it is possible to freely define a ratio of the steering angle of a steerable vehicle wheel relative to the operation angle of the steering wheel(steering angle ratio). Further, steering angle control through control of the steering actuator can be performed independently of the operation of the steering wheel, and this also allows performing of vehicle-behavior stabilizing control by the steering control.

For the motor vehicle steering apparatus capable of changing the steering angle ratio, not only the steer-by-wire system but also, for example, a variable-gear-ratio steering system can be used for the same purpose. The variable-gear-ratio steering system is a steering system in which a variable transmission ratio unit capable of changing a rotation transmission ratio is interposed between a steering wheel and a steering mechanism (Patent Document 2).

In the vehicle-behavior stabilizing control adopted in the steer-by-wire system, etc., feedforward control for defining a steering angle set value (steering-angle target value of a wheel) corresponding to the operation angle of the steering wheel is performed. On the other hand, feedback control is performed in which, based on a vehicle speed and an operation angle, a target yaw rate is calculated, and the steering angle set value is corrected so that a difference between the detected actual yaw rate and the target yaw rate is rendered zero. Thereby, active steering control for turning the wheels irrespective of the operation by a driver is performed, and the stabilization of the vehicle behavior is implemented.

Also, in the steer-by-wire system, etc., a counter-force actuator for imparting an operation counter-force to steering wheels is provided. The counter-force actuator is controlled corresponding to the operation angle of a steering wheel and the vehicle speed. This leads to imparting the steering wheel with the operation counter-force that is similar to the conventional motor vehicle steering apparatus in which the steering wheel and the steering mechanism are mechanically coupled. In this way, a bilateral servo system in which an external force exerted on the steering mechanism side is returned back to the steering wheel is constituted.

The active steering control demonstrates its performance on a slippery road surface such as a snowy road. However, on such a road surface, as compared to a normal road surface, unevenness such as wheel ruts are formed more easily on the road surface. Corresponding thereto, there easily occurs an instance where the vehicle attitude easily becomes unstable, and the vehicle behavior rapidly changes. In such an instance, there may be a case where the vehicle behavior can be guided to a more stable direction if the operation by a driver is reflected, rather than waiting for the active steering control.

Further, on a road surface formed with the aforementioned unevenness, the steering wheel is easily jolted. At this time, it is probable that a counter-force larger than the driver would anticipate is transmitted to the driver via the steering wheel. This may result in a factor that makes the vehicle behavior unstable.

Patent Document 1: U.S. Pat. No. 6,415,215
Patent Document 2: Japanese Unexamined Patent Publication No. 2006-2805

DISCLOSURE OF THE INVENTION

Means for Solving the Problem

An object of the present invention is to provide a motor vehicle steering apparatus capable of further stabilizing vehicle behavior by appropriately performing vehicle-behavior stabilizing control.

Another object of the present invention is to provide a motor vehicle steering apparatus capable of contributing to stabilization of vehicle behavior by appropriately controlling an operation counter-force.

A motor vehicle steering apparatus of the present invention is provided with: a steering-angle feedforward-control-value setting unit (31) arranged to set a steering angle value (steering-angle feedforward control value) that corresponds to a steering state; a vehicle-behavior-stabilization controlling unit (32, 33, 34) including a steering-angle feedback-control-value setting unit (33, 34) arranged to set a steering-angle correction value (steering-angle feedback-control value) that corresponds to vehicle behavior; and a feedback-gain changing unit (40, 42) to decrease a gain of the steering-angle feedback-control-value setting unit to a value less than at a normal time, when the steering-angle correction value is equal to or less than a predetermined value, during vehicle-behavior stabilizing control by the vehicle-behavior-stabilization controlling unit. It is noted that in this part of the specification, numbers in parentheses represent the corresponding constituent components, etc., in the embodiment described later. However, this is not intended to mean that the present invention should be interpreted as being limited to the embodiment.

According to this arrangement, in a case where vehicle-behavior stabilizing control by a vehicle-behavior-stabilization controlling unit is performed as a result of unstable vehicle behavior, when a steering-angle correction value (correction value for active steering control) to stabilize the vehicle behavior is equal to or less than a predetermined value, a gain of a steering-angle feedback-control-value setting unit is decreased to a value less than at a normal time (when the steering-angle correction value exceeds the predetermined value). Thereby, the vehicle-behavior stabilizing control is suppressed while feedforward control in which a steering angle value is set corresponding to a steering state can be prioritized. As a result, when a response of a driving operation for the vehicle behavior stabilization is faster than that of the vehicle-behavior stabilizing control, steering control in which an operation by a driver is preferentially reflected is enabled. On the other hand, when the steering-angle correction value exceeds the predetermined value, the steering-angle correction value is reflected in the steering control with the gain at a normal time. Therefore, when the response of the vehicle-behavior stabilizing control is faster than that of the driving operation, the vehicle-behavior stabilizing control can be performed normally.

In this way, the vehicle-behavior stabilizing control can be suppressed corresponding to a situation (for example, an operation timing or an operation speed of a driver), and the vehicle-behavior stabilizing control can be therefore performed more appropriately. As a result, the vehicle behavior can be further stabilized. The operation speed may be a change speed or a change acceleration of an operation angle degree, for example, or may be a change speed or a change acceleration of an operation torque.

The predetermined value may be set substantially equal to an upper-limit value of a steering angle correctable by a driver.

The motor vehicle steering apparatus may further include a feedforward-gain changing unit (40, 41) arranged to increase the gain of the steering-angle feedforward-control-value setting unit to a value more than at a normal time, when the steering-angle correction value is equal to or less than the predetermined value, during vehicle-behavior stabilizing control by the vehicle-behavior-stabilization controlling unit.

According to this arrangement, when a response of a driving operation is faster than that of the vehicle-behavior stabilizing control, a gain of the steering-angle feedforward-control value setting unit to set a steering angle value that corresponds to a steering state is increased. Thereby, the steering by the driver can be further prioritized, and the vehicle behavior stabilization by the steering by the driver can therefore be promoted.

The motor vehicle steering apparatus may be provided further with an operation-counter-force adjusting unit (43) arranged to adjust an operation counter-force of the operation member; and an operation-counter-force controlling unit (40) arranged to control the operation-counter-force adjusting unit such that an operation counter-force becomes smaller than at a normal time, when the steering-angle correction value is equal to or less than the predetermined value, during vehicle-behavior stabilizing control by the vehicle-behavior-stabilization controlling unit.

According to this arrangement, the operation counter-force is made small when the gain of the steering-angle feedback-control-value setting unit is decreased while prioritizing the operation by the driver. Thereby, the steering burden of the driver is alleviated, and therefore, the vehicle behavior stabilization by the operation by the driver can be further promoted.

The motor vehicle steering apparatus may be provided further with an operation determining unit (S10) arranged to determine whether a driver performs the steering operation. In this case, the feedback-gain changing unit may preferably decrease the gain of the steering-angle feedback-control-value setting unit to a value less than at a normal time, on condition that the driver performs the steering operation. Further, the feedforward-gain changing unit may preferably increase the gain of the steering-angle feedforward-control-value setting unit to a value more than at a normal time, on condition that the driver performs steering operation. Moreover, the operation-counter-force controlling unit may preferably control the operation-counter-force adjusting unit such that the operation counter-force becomes smaller than at a normal time, on condition that the driver performs the steering operation.

These and further other objects, features and effects of the present invention will be more apparent from the following embodiments described with reference to the accompanying drawings.

DESCRIPTION OF SYMBOLS

1 . . . steering wheel; 2 . . . steering actuator; 5 . . . steering mechanism; 31 . . . steering-angle setting section; 32 . . . target-yaw-rate setting section; 33 . . . yaw-rate-difference calculating section; 34 . . . steering-angle-correction-value calculating section; 35 . . . set-steering-angle correcting section; 36 . . . target-current calculating section; 37 . . . counter-force setting section; 40 . . . gain controlling section; 41, 42, 43 . . . gain adjusting section.

BEST MODE FOR CARRYING OUT THE INVENTION

Figure 1:
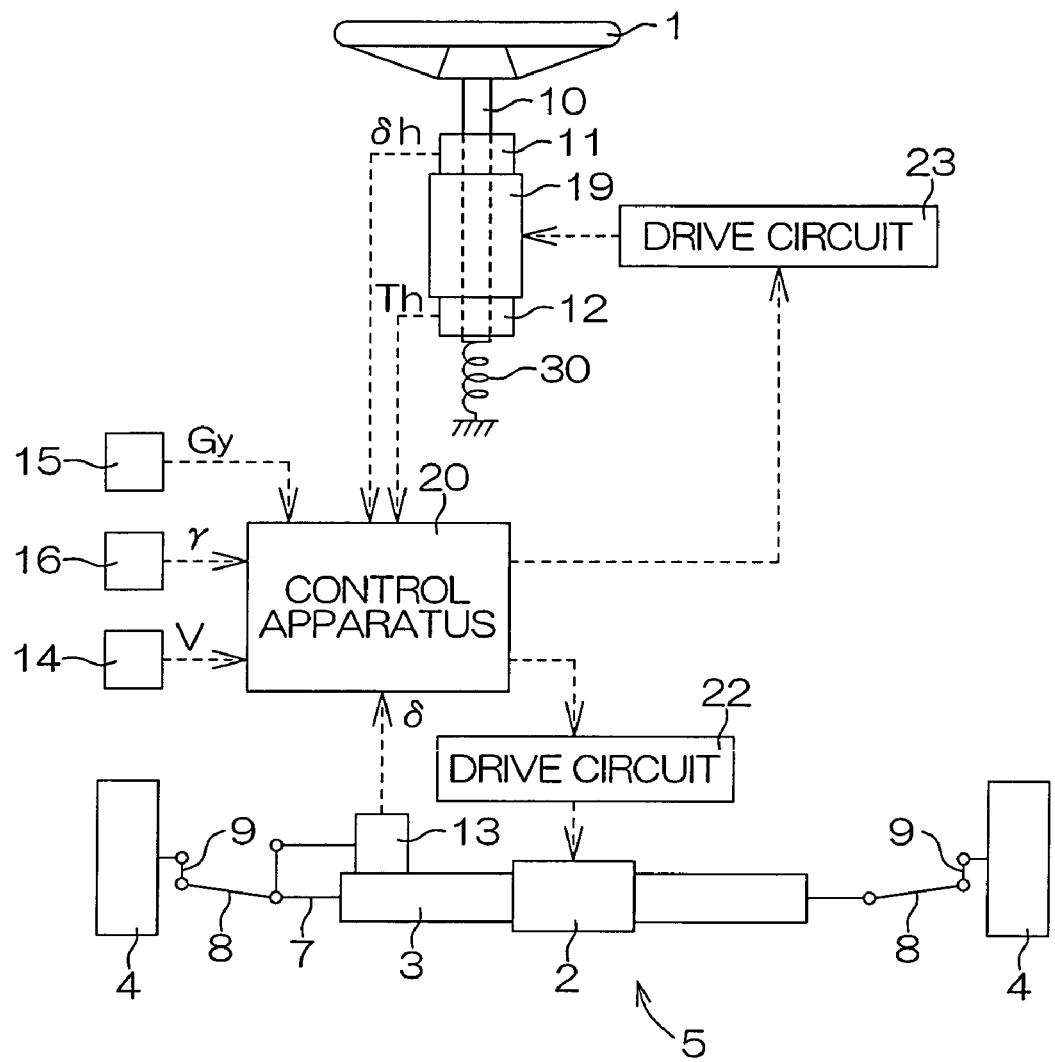
FIG. 1 is a schematic drawing for explaining the constitution of a motor vehicle steering apparatus according to one embodiment of the present invention.

FIG. 1 is a schematic drawing for explaining the constitution of a motor vehicle steering apparatus according to one embodiment of the present invention, and shows the constitution of a steer-by-wire system. The motor vehicle steering apparatus is provided with: a steering wheel 1 as an operation member operated by a driver to steer the vehicle; a steering actuator 2 driven corresponding to rotational operation of the steering wheel 1; and a steering gear 3 to transmit the driving force of the steering actuator 2 to right and left front wheels 4 as steerable vehicle wheels. Between the steering wheel 1 and a steering mechanism 5 including the steering actuator 2, etc., there is no mechanical coupling to mechanically transmit an operation torque applied to the steering wheel 1 to the steering mechanism 5. When the steering actuator 2 is drive-controlled corresponding to an operation amount (an operation angle or an operation torque) of the steering wheel 1, the wheels 4 are turned.

As the steering actuator 2, for example, an electrical motor such as a known brushless motor can be applied. The steering gear 3 has a motion conversion mechanism that converts the rotational movement of the output shaft of the steering actuator 2 into linear movement (linear movement in the right and left direction of the vehicle) of the steering rod 7. The movement of the steering rod 7 is transmitted to the wheels 4 via tie rods 8 and knuckle arms 9, and the toe angle (steering angle) of the wheels 4 is thereby changed. As the steering gear 3, a known steering gear can be used, and its constitution is not limited as long as the motion of the steering actuator 2 can be transmitted to the wheels 4 so that the steering angle is changed. The wheel alignment is set such that when the steering actuator 2 is not being driven, the wheels 4 can return to the straight-ahead steering positions by self-aligning torque.

The steering wheel 1 is linked to a rotation shaft 10 that is rotatably supported by the vehicle body. A counter-force actuator 19 to generate a counter-force torque acting on the steering wheel 1 is arranged on the rotation shaft 10. As the counter-force actuator 19, an electrical motor such as a brushless motor having an output shaft integrally formed with the rotation shaft 10 can be applied.

Between the vehicle body and the rotation shaft 10, an elastic member 30 that imparts the elastic force in the direction in which the steering wheel 1 is induced to return to the straight-ahead steering position is arranged. As the elastic member 30, for example, a spring that imparts elastic force to the rotation shaft 10 can be applied. When the counter-force actuator 19 is not imparting torque to the rotation shaft 10, elastic force of the elastic member 30 operates to return the steering wheel 1 to the straight-ahead steering position.

In order to detect an operation angle (rotation angle) δh of the steering wheel 1, an angle sensor 11 for detecting the rotation angle of the rotation shaft 10 is arranged. Further, in order to detect an operation torque Th acted on the steering wheel 1 by a vehicle driver, a torque sensor 12 to detect a torque transmitted by the rotation shaft 10 is arranged. Further, a steering angle sensor 13 which detects the steering angle (steering angle of the steering mechanism 5) δ of the vehicle is constituted of a potentiometer to detect an amount of movement of a steering rod 7 that corresponds to the steering angle. Further, a speed sensor 14 to detect a vehicle speed V, a lateral acceleration sensor 15 to detect a lateral acceleration Gy of the vehicle, and a yaw rate sensor 16 to detect a yaw rate γ of the vehicle are provided.

The angle sensor 11, the torque sensor 12, the steering angle sensor 13, the speed sensor 14, the lateral acceleration sensor 15, and the yaw rate sensor 16 are respectively connected to a control apparatus 20 constituted by a computer. The control apparatus 20 is to control the steering actuator 2 and the counter-force actuator 19 via drive circuits 22 and 23.

Figure 2:
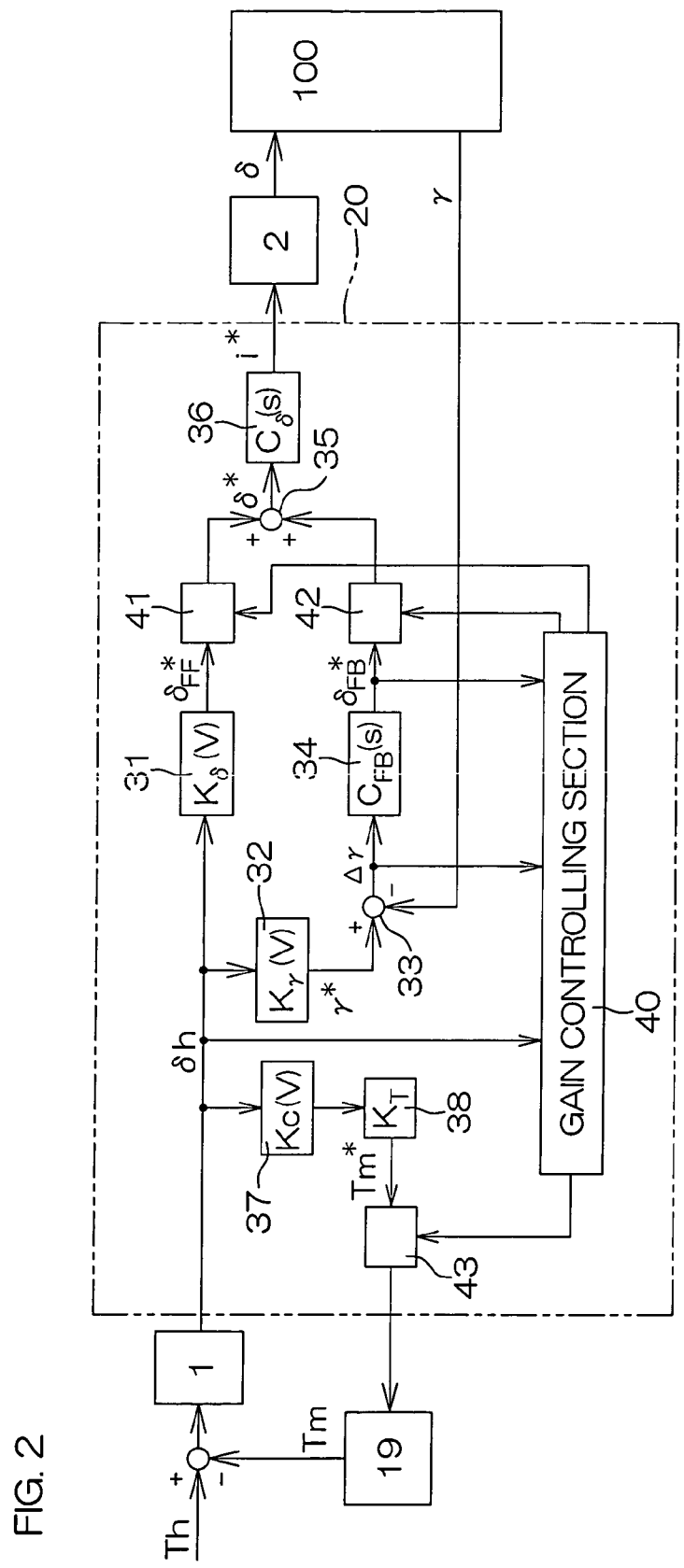
FIG. 2 is a control block diagram according to the embodiment in FIG. 1.

FIG. 2 is a control block diagram of the control apparatus 20. To the steering wheel 1, the driver applies the operation torque Th, and the counter-force actuator 19 applies the counter-force torque Tm. The operation angle δh as the operation amount of the steering wheel 1 is detected by the angle sensor 11, and input to the control apparatus 20.

The control apparatus 20 has a plurality of functional processing sections realized by a software process. That is, the control apparatus 20 is provided with: a steering-angle setting section 31; a target-yaw-rate setting section 32; a yaw-rate-difference calculating section 33; a steering-angle-correction-value calculating section 34; a set-steering-angle correcting section 35; a target-current calculating section 36; a counter-force setting section 37; a gain multiplying section 38; gain adjusting sections 41, 42, 43; and a gain controlling section 40.

The steering-angle setting section 31 uses a transfer function Kδ (V) to seek a steering-angle set value $\delta_{FF}^*$ that corresponds to the operation angle δh and the vehicle speed V. Thereby, the feedforward control of the steering angle δ is performed.

A gain of the steering-angle set value $\delta_{FF}^*$ is adjusted by the gain adjusting section 41, and the steering-angle set value $\delta_{FF}^*$ that has been gain-adjusted is given to the set-steering-angle correcting section 35. In this manner, the steering-angle setting section 31 has a function as a steering-angle feedforward-control-value setting unit which defines the steering-angle set value $\delta_{FF}^*$ (steering angle value) in accordance with the steering state.

Based on the operation angle δh and the vehicle speed V, the target-yaw-rate setting section 32 uses the transfer function Kγ(V) to seek a target yaw rate γ* as a vehicle behavior target value. The target yaw rate γ* is given to a yaw-rate-difference calculating section 33.

The yaw-rate-difference calculating section 33 subtracts from the target yaw rate γ* the actual yaw rate γ of the vehicle 100 detected by the yaw rate sensor 16 to seek the difference Δγ between these two rates.

The steering-angle-correction-value calculating section 34 uses a transfer function $C_{FB}(S)$ (in this case, s denotes a Laplace operator) to seek a steering-angle correction value $\delta_{FB}^*$ that corresponds to the yaw rate difference Δγ. The steering-angle correction value $\delta_{FB}^*$, which undergoes gain adjustment by the gain adjusting section 42, is given to the set-steering-angle correcting section 35.

The set-steering-angle correcting section 35 corrects the steering-angle set value $\delta_{FF}^*$ with the steering-angle correction value $\delta_{FB}^*$ to seek the target steering angle δ*. In this way, the vehicle-behavior stabilizing control is performed in which the yaw rate γ detected by the yaw rate sensor 16 is fed back to thereby guide the yaw rate of the vehicle 100 to the target yaw rate γ*. That is, when the absolute value of the yaw rate difference Δγ is large, the absolute value of the steering-angle correction value $\delta_{FB}^*$ (steering-angle correction value) becomes large corresponding thereto. Thereby, the active steering control, in which the steering angle is changed irrespective of the operation of the steering wheel 1 by the driver, is performed.

The yaw-rate-difference calculating section 33 and the steering-angle-correction-value calculating section 34 function as a steering-angle-feedback-control-value setting unit to set the steering-angle correction value $\delta_{FB}^*$ (steering-angle correction value) in accordance with the vehicle behavior. Further, the target-yaw-rate setting section 32 in addition to these components constitute the vehicle-behavior-stabilization controlling unit which stabilizes the vehicle behavior.

The target-current calculating section 36 uses a transfer function Cδ (s) to seek a target current value i* that corresponds to the target steering angle δ*. When the steering actuator 2 is controlled so that the target current value i* is achieved, the steering angle δ of the steering mechanism 5 is brought close to the target steering angle δ*.

Based on the operation angle δh detected by the angle sensor 11 and the vehicle speed V, the counter-force setting section 37 obtains an operation-counter-force target value using a transfer function Kc(V). This value is multiplied by a torque gain $K_T$ to obtain a target counter-force torque Tm*. Further, the target counter-force torque Tm* is gain-adjusted by the gain adjusting section 43. Based on the target counter-force torque Tm* that is gain-adjusted, the counter-force actuator 19 is controlled.

Thus, the counter-force actuator 19 operates to impart the counter-force torque Tm to the steering wheel 1 in accordance with the operation angle δh and the vehicle speed V. Thereby, the bilateral servo system is constituted in which the external force exerted on the steering mechanism 5 side is returned back to the steering wheel 1. By the gain adjustment by the gain adjusting section 43, the counter-force torque imparted to the steering wheel 1 is adjusted. In this way, the gain adjusting section 43 has a function as an operation-counter-force adjusting unit.

The gain controlling section 40 variably sets respective gains in the gain adjusting sections 41, 42, and 43, based on the operation angle δh, the yaw rate difference Δγ, and the steering-angle correction value $\delta_{FB}^*$.

More specifically, the gain controlling section 40 changes the gain of the gain adjusting section 41 to change the gain of the steering-angle set value $\delta_{FF}^*$, i.e., the gain for output of the steering-angle setting section 31 as the steering-angle feedforward-control-value setting unit. That is, by the gain controlling section 40 and the gain adjusting section 41, a feedforward-gain changing unit is constituted.

Further, the gain controlling section 40 changes the gain of the gain adjusting section 42 to change the gain of the steering-angle correction value $\delta_{FB}^*$. That is, by the gain controlling section 40 and the gain adjusting section 42, a feedback-gain changing unit is constituted.

Moreover, the gain controlling section 40 changes the gain of the gain adjusting section 43 to change the gain of the target counter-force torque Tm*. That is, the gain controlling section 40 has a function as an operation-counter-force controlling unit. The gain controlling section 40 also has a function as an operation determining unit which determines whether the driver performs the steering operation.

Figure 3:
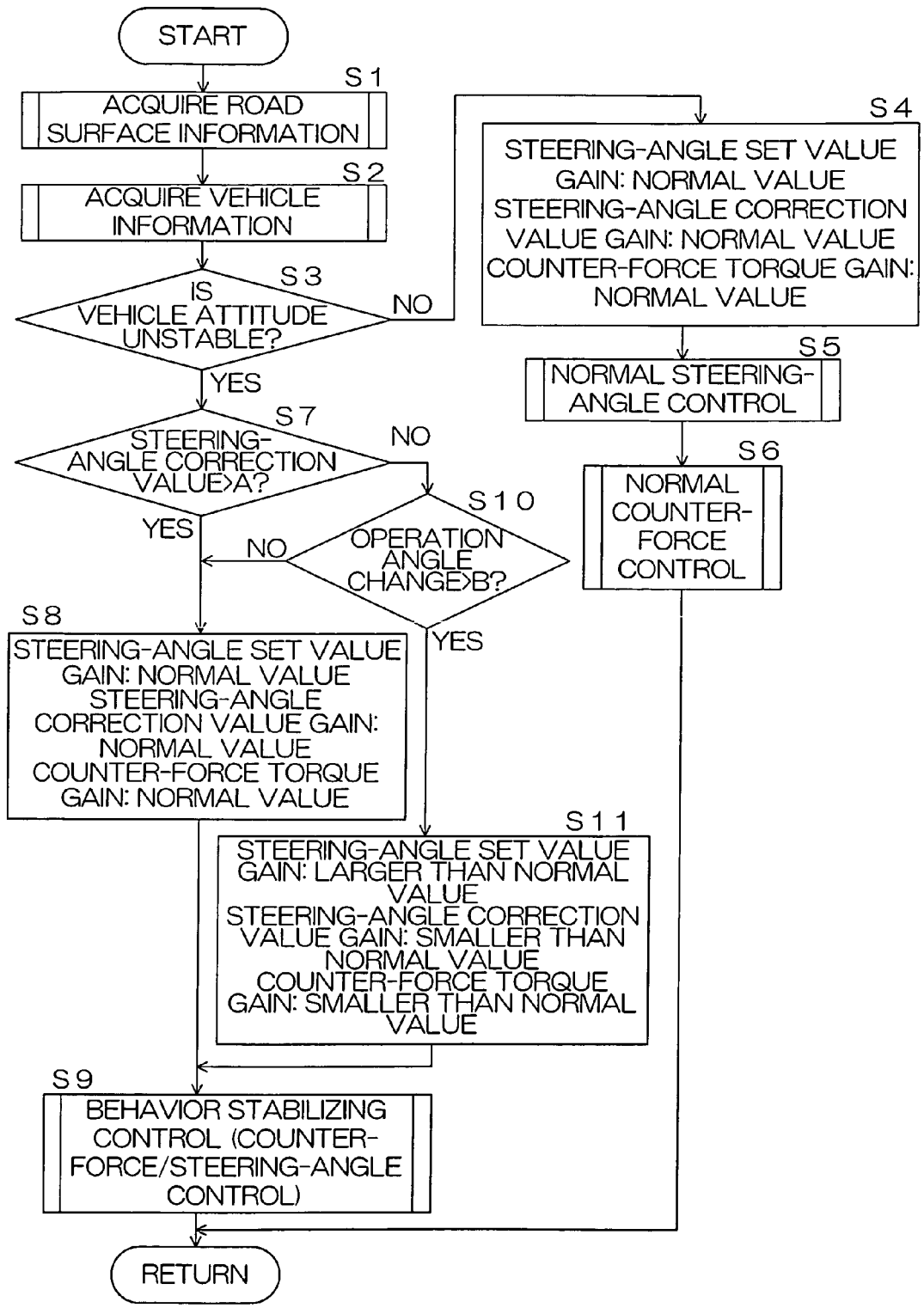
FIG. 3 is a flowchart for explaining the operation of a control apparatus.

FIG. 3 is a flowchart for explaining a process for the control apparatus 20 to repeatedly execute for each predetermined control cycle.

The control apparatus 20 acquires road surface information and vehicle information (steps S1 and S2). Based on the acquired information, various calculations are performed inside the control apparatus 20.

The road surface information primarily is about a change in tire angle corresponding to an external force torque transmitted from the road surface to the steering mechanism 5 or an external force from the road surface. When the steering actuator 2 is constituted of an electrical motor, for example, the external force torque can be detected based on a motor current of that electrical motor. As a matter of course, a dedicated sensor may be placed on the steering rod 7, for example, and this sensor may be used to detect the external force torque. The change in tire angle may be detected by the steering angle sensor 13.

On the other hand, the vehicle information includes the lateral acceleration Gy detected by the lateral acceleration sensor 15, the yaw rate $\gamma$ detected by the yaw rate sensor 16, the vehicle speed V detected by the speed sensor 14, etc.

The gain controlling section 40 determines whether the vehicle attitude is unstable based on the yaw rate difference $\Delta\gamma$ calculated by the yaw-rate-difference calculating section 33 (step S3). For example, the gain controlling section 40 compares an absolute value $|\Delta\gamma|$ of the yaw rate difference with a predetermined minute threshold value $\epsilon$, and when $|\Delta\gamma| \leq \epsilon$ is established, the gain controlling section 40 determines that there is almost no (substantially zero) difference between the actual yaw rate $\gamma$ and the target yaw rate $\gamma^*$, and that the vehicle behavior is stable. On the other hand, when $|\Delta\gamma| > \epsilon$ is established, the gain controlling section 40 determines that there is a delay in making the actual yaw rate $\gamma$ match the target yaw rate $\gamma^*$, and therefore, the vehicle behavior is unstable.

When it is determined that the vehicle behavior is stable (step S3: NO), the gain controlling section 40 maintains gains a, b, and c of the gain adjusting sections 41, 42, and 43 at normal values $a_0$, $b_0$, and $c_0$ (for example, $a_0=b_0=c_0=1$), respectively (step S4). Thereby, normal steering-angle control in which the target steering angle $\delta^*$ is sought as normally (step S5), and normal counter-force control in which the target counter-force torque Tm* is sought as normally (step S6) are performed.

On the other hand, when the vehicle behavior is unstable (step S4: YES), the behavior stabilizing control by functioning of the steering-angle-correction-value calculating section 34 (step S9) is performed. When this behavior stabilizing control is performed, the gain controlling section 40 compares the steering-angle correction value $\delta_{FB}^*$ with a predetermined threshold value A (step S7). The threshold value A, for example, may be set substantially equal to the upper-limit value of the steering angle that can be corrected by the driver's operation of the steering wheel 1.

When the steering-angle correction value $\delta_{FB}^*$ is larger than the threshold value A (step S7: YES), it can be understood that the steering operation by the driver is delayed, and thus, it is appropriate that the behavior stabilizing control is functioned as normally. Therefore, with the gains a, b, and c of the gain adjusting sections 41, 42, and 43 being maintained at their respective normal values $a_0$, $b_0$, and $c_0$ (step S8), the gain controlling section 40 causes the steering-angle control, the behavior stabilizing control, and the counter-force control to be performed (step S9).

When the steering-angle correction value $\delta_{FB}^*$ is equal to or less than the threshold value A (step S7: NO), it can be understood that the steering operation by the driver sufficiently matches the behavior change of the vehicle, and thus, it is appropriate that the behavior stabilizing control is suppressed while prioritizing the steering operation by the driver. In this case, the gain controlling section 40 further confirms whether the driver performs the steering operation. That is, for example, it is determined whether the change of the operation angle $\delta$h (a change amount of the operation angle $\delta$h from the preceding control cycle, for example) exceeds a predetermined threshold value B (step S10). This determination can be replaced with a determination whether the change of the operation torque Th (a change amount of the operation torque Th from the preceding control cycle, for example) exceeds a predetermined threshold value.

Unless the steering operation by the driver is acknowledged (step S10: NO), the process proceeds to a step S8, and with a state where the gains a, b, and c of the gain adjusting sections 41, 42, and 43 being maintained at their respective normal values $a_0$, $b_0$, and $c_0$ (step S8), the gain controlling section 40 causes the steering-angle control, the behavior stabilizing control, and the counter-force control to be performed (step S9).

When the change of the operation angle $\delta$h exceeds the threshold value B (step S10: YES), and therefore, when the steering operation by the driver is acknowledged, the gain controlling section 40 sets the gain of the gain adjusting section 41, i.e., the gain "a" by which the steering-angle set value $\delta_{FF}^*$ is multiplied, to a value $a_1$ ($a_1 > a_0$) larger than the normal value $a_0$ (step S11). At this time also, the gain controlling section 40 sets the gains of the gain adjusting sections 42 and 43, i.e., the gains b and c by which the steering-angle correction value $\delta_{FB}^*$ and the target counter-force torque Tm* are respectively multiplied, to values $b_1$ and $c_1$ ($b_1 < b_0$ and $c_1 < c_0$) smaller than their respective normal values (step S11). Thereafter, with these set gains $a_1$, $b_1$, and $c_1$, the steering-angle control, the behavior stabilizing control, and the counter-force control are performed (step S9).

When the gain $a_1$ larger than the normal value $a_0$ is set to the gain adjusting section 41, the steering operation by the driver is more greatly reflected in the target steering angle $\delta^*$. More specifically, the steering gear ratio becomes large and a steering-angle change amount for the operation amount by the driver also becomes large. On the other hand, when the gain $b_1$ smaller than the normal value $b_0$ is set to the gain adjusting section 42, the active steering control not relying on the steering operation by the driver is suppressed. In this way, the steering angle $\delta^*$ becomes a value in which the steering operation by the driver is reflected more greatly than at a normal time. Thereby, in a case where the steering wheel is jolted in a situation of a slippery road surface with unevenness such as a snowy road formed with wheel ruts, if the driver quickly performs the steering operation that is made to match an abrupt vehicle behavior change, recovery of the vehicle attitude can be subjected to operation by the driver. In this way, the vehicle behavior can be quickly stabilized.

Further, when the gain $c_1$ smaller than the normal value $c_0$ is set to the gain adjusting section 43, a control algorithm is released (at least partially released) from a bilateral servo system. As a result, in a situation where the steering wheel is jolted in a situation of a slippery road surface with unevenness such as a snowy road formed with wheel ruts, the operation counter-force transmitted via the steering wheel 1 to the driver is alleviated, and thus, the steering burden of the driver can be alleviated. As a result of the facilitation involving vehicle behavior stabilization by the steering operation by the driver, safety on a slippery road surface can be improved.

In this way, according to this embodiment, the active steering control can be suppressed while prioritizing the steering operation by the driver depending on the traveling situation, and thus, the vehicle behavior can be more quickly stabilized. Further, as a result of enabling a decrease in the operation counter-force depending on the traveling situation, imparting the steering wheel 1 with the operation counter-force larger than the driver would anticipate can be suppressed, thereby suppressing or preventing the steering operation that may increase unstable vehicle behavior.

Thus, one embodiment of the present invention is described, and the present invention can be further carried out in other modes. For example, in the aforementioned embodiment, the operation angle δh is used as a variable representing a steering state. However, the operation torque Th may be used as the variable representing a steering state, and based on the operation torque Th, the target steering angle δ* or the target yaw rate γ* may be sought.

Further, in the aforementioned embodiment, a steer-by-wire system has been described as an example; similar control may also be applied to a variable-gear-ratio steering apparatus in which the relationship between the operation angle and the steering angle is variable between the steering wheel and the steerable vehicle wheel. In this case, an interval between the steering wheel and the steerable vehicle wheel do not need to be separated mechanically, and both components may be coupled mechanically via a variable transmission ratio unit, for example.

Although the embodiments of the present invention are described in detail, these embodiments are merely specific examples used for clarifying the technical contents of the present invention. Therefore, the present invention should not be construed as being limited in any way to these specific examples. The spirit and scope of the present invention are limited only by the scope of the appended claims.

This application corresponds to Japanese Patent Application No. 2006-344594 filed with the Japanese Patent Office on Dec. 21, 2006, the full disclosure of which is incorporated herein by reference.

The invention claimed is:

1. A motor vehicle steering apparatus, comprising:
a steering-angle feedforward-control-value setting unit arranged to set a steering angle value that corresponds to a steering state;
a vehicle-behavior-stabilization controlling unit including a steering-angle feedback-control-value setting unit arranged to set a steering-angle correction value that corresponds to vehicle behavior; and
a feedback-gain changing unit arranged to decrease a gain of the steering-angle feedback-control-value setting unit to a value less than at a normal time, when the steering-angle correction value is equal to or less than a predetermined value, during vehicle-behavior stabilizing control by the vehicle-behavior-stabilization controlling unit.

2. The motor vehicle steering apparatus according to claim 1, further comprising an operation determining unit arranged to determine whether a driver performs steering operation, wherein
the feedback-gain changing unit decreases the gain of the steering-angle feedback-control-value setting unit to a value less than at a normal time, on condition that the driver performs the steering operation.

3. The motor vehicle steering apparatus according to claim 1, further comprising a feedforward-gain changing unit arranged to increase the gain of the steering-angle feedforward-control-value setting unit to a value more than at a normal time, when the steering-angle correction value is equal to or less than the predetermined value, during vehicle-behavior stabilizing control by the vehicle-behavior-stabilization controlling unit.

4. The motor vehicle steering apparatus according to claim 3, further comprising an operation determining unit arranged to determine whether a driver performs steering operation, wherein
the feedforward-gain changing unit increases the gain of the steering-angle feedforward-control-value setting unit to a value more than at a normal time, on condition that the driver performs the steering operation.

5. The motor vehicle steering apparatus according to claim 1, further comprising:
an operation-counter-force adjusting unit arranged to adjust an operation counter-force of an operation member; and
an operation-counter-force controlling unit arranged to control the operation-counter-force adjusting unit such that an operation counter-force becomes smaller than at a normal time, when the steering-angle correction value is equal to or less than the predetermined value, during vehicle-behavior stabilizing control by the vehicle-behavior-stabilization controlling unit.

6. The motor vehicle steering apparatus according to claim 5, further comprising an operation determining unit arranged to determine whether a driver performs steering operation, wherein
the operation-counter-force controlling unit controls the operation-counter-force adjusting unit such that the operation counter-force becomes smaller than at a normal time, on condition that the driver performs the steering operation.

7. The motor vehicle steering apparatus according to claim 1, wherein
the predetermined value is set substantially equal to an upper-limit value of a steering angle correctable by a driver.

8. The motor vehicle steering apparatus according to claim 1, further comprising
a feedforward-gain changing unit arranged to increase the gain of the steering-angle feedforward-control-value setting unit to a value more than at a normal time, when the steering-angle correction value is equal to or less than the predetermined value, during vehicle-behavior stabilizing control by the vehicle-behavior-stabilization controlling unit, and
an operation determining unit arranged to determine whether a driver performs steering operation, wherein
the feedback-gain changing unit decreases the gain of the steering-angle feedback-control-value setting unit to a value less than at a normal time, on condition that the driver performs the steering operation.

9. The motor vehicle steering apparatus according to claim 1, further comprising
a feedforward-gain changing unit arranged to increase the gain of the steering-angle feedforward-control-value setting unit to a value more than at a normal time, when the steering-angle correction value is equal to or less than the predetermined value, during vehicle-behavior stabilizing control by the vehicle-behavior-stabilization controlling unit, and
an operation determining unit arranged to determine whether a driver performs steering operation, wherein the feedback-gain changing unit decreases the gain of the steering-angle feedback-control-value setting unit to a value less than at a normal time, on condition that the driver performs the steering operation, and the feedforward-gain changing unit increases the gain of the steering-angle feedforward-control-value setting unit to a value more than at a normal time, on condition that the driver performs the steering operation.

* * * * *